United States Patent
Wagner

(10) Patent No.: US 6,823,024 B2
(45) Date of Patent: Nov. 23, 2004

(54) COMPENSATION CIRCUIT AND METHOD FOR COMPENSATING FOR AN OFFSET

(75) Inventor: Elmar Wagner, Duisburg (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/291,012

(22) Filed: Nov. 8, 2002

(65) Prior Publication Data

US 2003/0086516 A1 May 8, 2003

Related U.S. Application Data

(63) Continuation of application No. PCT/EP01/05218, filed on May 8, 2001.

(30) Foreign Application Priority Data

May 8, 2000 (EP) .............................. 00109738

(51) Int. Cl.⁷ .............................. H04L 5/16; H04L 25/06

(52) U.S. Cl. .................. 375/319; 375/219; 375/222; 375/317

(58) Field of Search .................. 375/219, 256, 375/257, 316, 317, 377, 350, 334, 335, 222, 319; 708/300, 714, 322; 324/76.28, 677; 327/552, 553, 554, 555

(56) References Cited

U.S. PATENT DOCUMENTS

| | | | | |
|---|---|---|---|---|
| 4,272,845 A | * | 6/1981 | Fiumani | 375/293 |
| 4,779,225 A | * | 10/1988 | Fukasawa et al. | 708/322 |
| 4,821,292 A | | 4/1989 | Childress | |
| 5,187,445 A | * | 2/1993 | Jackson | 327/553 |
| 5,245,646 A | * | 9/1993 | Jackson et al. | 377/2 |
| 5,473,278 A | * | 12/1995 | Shibata | 327/552 |
| 5,914,633 A | * | 6/1999 | Comino et al. | 327/553 |
| 5,933,458 A | | 8/1999 | Leurent et al. | |
| 6,118,829 A | * | 9/2000 | North | 375/317 |
| 6,181,740 B1 | * | 1/2001 | Yasuda | 375/232 |

* cited by examiner

Primary Examiner—Young T. Tse
Assistant Examiner—Sam K. Ahn
(74) Attorney, Agent, or Firm—Laurence A. Greenberg; Werner H. Stemer; Gregory L. Mayback

(57) ABSTRACT

To demodulate a frequency-modulated signal having an offset, two time constants are provided in a filter unit. The filter unit has two analog or digital low-pass filters or high-pass filters. A first switch is used to change over between the two time constants. If a plurality of bits having the same state succeed one another in a setting mode, the first switch is used to change over to a slower time constant so as not to corrupt the threshold voltage that is to be ascertained. In a normal mode, the stored threshold voltage is, then, used to distinguish between the states coded in an input signal. In such a context, the slower time constant is valid in the normal mode.

17 Claims, 6 Drawing Sheets

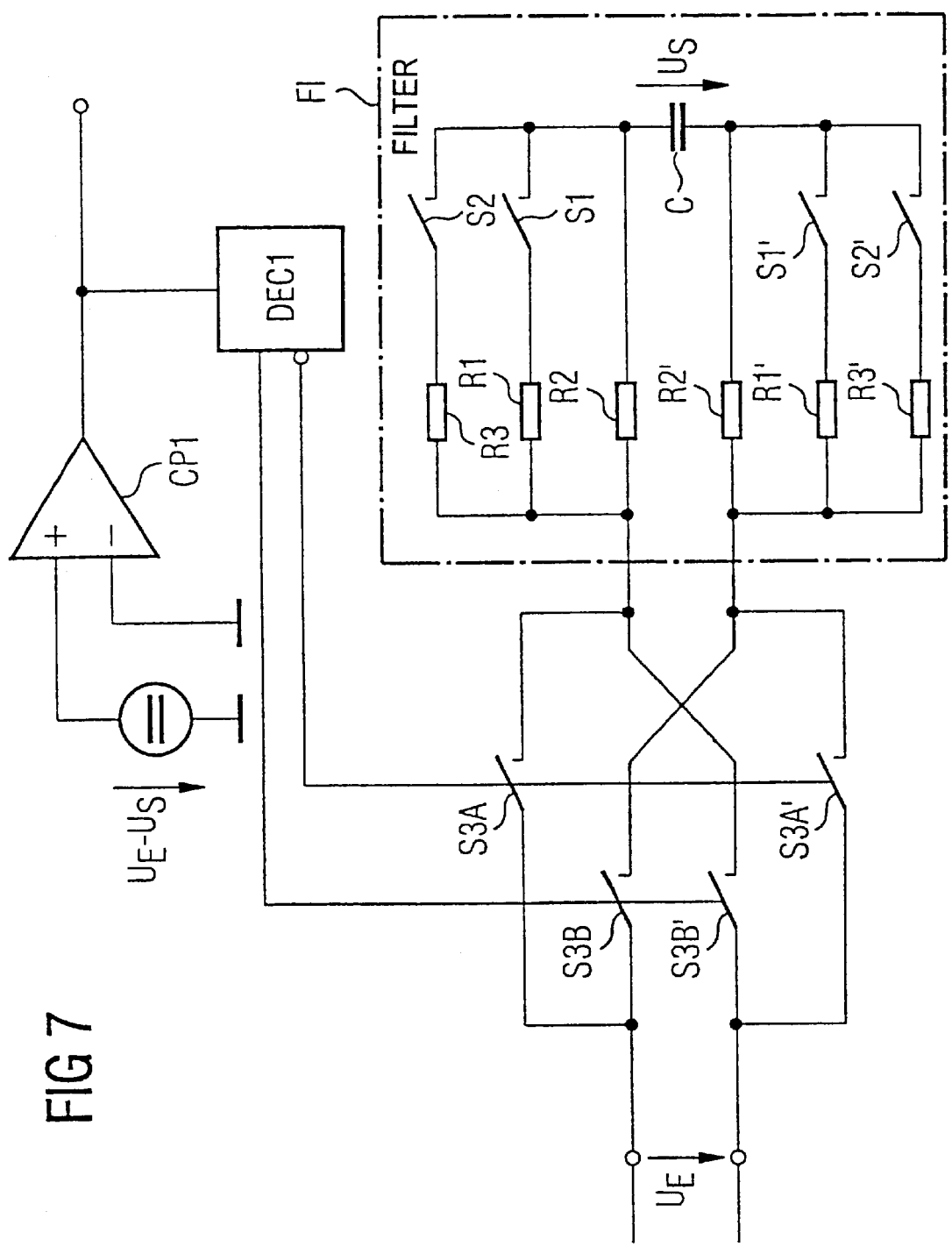

COMPENSATION CIRCUIT AND METHOD FOR COMPENSATING FOR AN OFFSET

CROSS-REFERENCE TO RELATED APPLICATION

This application is a continuation of copending International Application No. PCT/EP01/05218, filed May 8, 2001, which designated the United States and was not published in English.

BACKGROUND OF THE INVENTION

Field of the Invention

The invention relates to a compensation circuit for an input signal having an offset and to a method for compensating for an offset in an input signal.

Digital modulation methods in telecommunication involve the amplitude, the frequency, or the phase of a signal that has a carrier frequency being modulated in accordance with a data string that is to be transmitted. Frequency modulation or frequency shift keying (FSK) involves keying between different frequencies. In the simplest case, there are two binary states—zero and one—accordingly, signal transmission requires only two frequencies disposed symmetrically around the carrier frequency.

In modern communication methods, such as Global System for Mobile Communication (GSM), a Gaussian Minimum Shift Keying (GMSK) method is used in which digital information is coded using Gaussian pulses instead of square-wave pulses. The GMSK method is a continuous-phase FSK method. Like GSM, the Digital Enhanced Cordless Telecommunication (DECT) method used for communication in cordless telephones is also an SSK method.

To demodulate a frequency-modulated signal in a demodulator, the carrier frequency is assigned a mid-voltage in the receiver. The output voltage from the demodulator in the receiver is higher than the intermediate voltage when a logic one is transmitted and is lower than the intermediate voltage when a logic zero is transmitted. In the frequency-modulated signal, the carrier frequency is increased by a particular frequency swing to transmit a one and is reduced by a particular frequency swing to transmit a zero.

Tolerances mean that the carrier frequency of the frequency-modulated signal can vary, for example, on account of temperature drifts in a transmitter. This means that the intermediate voltage associated with the carrier frequency can also vary at the output of the demodulator such that a DC voltage offset exists. Tolerances in the receiver or demodulator itself, for example, production-dependent or temperature-dependent tolerances, mean that the intermediate voltage is subject to additional fluctuations. To stipulate a decision threshold that distinguishes a voltage associated with a logic one from a voltage associated with a logic zero, and, hence, distinguishes between the two states, it is necessary to stipulate a threshold voltage that compensates for the intermediate voltage's DC voltage offset (DC offset).

In prior art communication systems, for example, in the case of the DECT standard, such a threshold voltage is stipulated by virtue of each user data block being preceded by a preamble with a string of 16 bits that alternately contains ones and zeros and is used for DC offset compensation. A simple low-pass filter can be used to ascertain the mean voltage value of such a signal train corresponding to the first 16 bits, and, at the end of the 16-bit preamble, the value so obtained can be stored, for example, as a voltage value on a capacitor. This averaging or the generation of a threshold voltage is normally controlled in the digital baseband chip of a DECT receiver.

The "Bluetooth" system describes a wireless interface between individual components of information and communication systems for data transmission over short distances. By way of example, peripheral devices such as printer, mouse, keyboard, mobile telephone, modem, etc. can be wirelessly connected to a portable computer. The Bluetooth system operates in the 2.4 gigahertz Industrial Scientific and Medical (ISM) band. In most of the world's countries, for example, USA and Europe, the ISM band covers the frequency range from 2,400 to 2,483.5 megahertz. In this case, the channels are defined using the formula $f=2,402+n$ MHz, where f is the carrier frequency of the channel in question and the variable n can assume integer values from 0 to 78.

The problem with the Bluetooth system, which operates using a time slot method, is that the preamble for an access code, which is respectively placed in front of the actual user signal (payload) and normally includes 72 bits, is only 4 bits long. In addition, this 4-bit preamble's position in time in a bit sequence can vary by up to 10 bits. However, this 4-bit preamble is too short to stipulate a suitable decision threshold for reliably distinguishing between the logic states.

It is a conventional practice to use digital signal processing to determine a decision threshold for the digitized and demodulated data signal in order to determine the switching threshold for Bluetooth. However, the circuits required for such determination are very complex and, depending on the implementation of the digital signal processing, unreliable. U.S. Pat. No. 4,821,292 to Childress discloses a detector circuit that changes over to a shorter time constant during a signal preamble for the purpose of averaging (dotting pattern). Such changeover achieves faster threshold-value readjustment.

SUMMARY OF THE INVENTION

It is accordingly an object of the invention to provide a compensation circuit and method for compensating for an offset that overcomes the hereinafore-mentioned disadvantages of the heretofore-known devices and methods of this general type and that are suitable for signals having a short preamble.

With the foregoing and other objects in view, there is provided, in accordance with the invention, a compensation circuit for an input signal having an offset, including a filter unit receiving the input signal in a signal flow direction and having a signal path with a first time constant, a signal path with a second time constant, and a signal path with a third time constant, a first switch connected to the signal path with the first time constant and to the signal path with the second time constant for changing the filter unit between the signal path with the first time constant and the signal path with the second time constant, a second switch connected to the signal path with the third time constant for changing the filter unit over to the signal path with the third time constant, a first comparator connected downstream of the filter unit with respect to the signal flow direction, the first comparator having a first output, a second comparator connected downstream of the filter unit with respect to the signal flow direction, the second comparator having a second output, a third comparator connected downstream of the filter unit with respect to the signal flow direction, the third comparator having a third output, a first decoder connected to the first output and to the first switch for controlling the first switch, and a second decoder connected to the second switch and to a respective one of the second output and the third output for actuating the second switch.

With the objects of the invention in view, there is also provided a method for compensating for an offset in an input signal, including the steps of filtering an input signal utilizing a first time constant, forming an output signal having discrete states by comparing the filtered input signal with one of a threshold voltage and the input signal in unfiltered form, effecting a changeover to a second time constant longer than the first time constant in a setting mode if and for as long as the output signal has at least two identical, successive states, and setting the second time constant in a normal mode following the setting mode.

With the objects of the invention in view, there is also provided a method for compensating for an offset in an input signal, including the steps of generating a filtered output signal by filtering an input signal utilizing a first time constant, forming an output signal having discrete states by comparing the filtered output signal with one of a threshold voltage and the input signal in unfiltered form, effecting a changeover to a second time constant longer than the first time constant in a setting mode if and for as long as the output signal has at least two identical, successive states, and setting the second time constant in a normal mode following the setting mode.

The principle underlying the invention is that it is possible to change over between a first and a second time constant, and, hence, the offset in an input signal can be compensated for using a first comparator and a first decoder. In such a case, the first decoder can influence the first switch S1 as appropriate based upon the output signal's bit train that is at the comparator output.

The input signal can be a sequential signal coded on a bit-by-bit basis. A decision threshold is determined by turning on the first switch in a setting mode, which means that a first time constant is active. When a suitable decision threshold has been set, the first switch can be turned off during a user data transmission and it is, thus, possible to change over to another, second time constant, which can be greater than the first time constant. However, the first switch can also be turned off during the actual setting of the decision threshold that precedes useful operation. This can be appropriate, for example, if the input signal has a succession of several identical states immediately succeeding one another. This is because these states would result in the decision threshold not being suitable for distinguishing between the state levels because the decision threshold would assume the value of one state, zero or one. This means that the principle described can also be applied for those signals whose preamble is short.

The first and second time constants can be produced using a respective low-pass filter or using a respective high-pass filter.

If low-pass filters are used, they can either be in analog form including a respective resistor and capacitor or can be implemented digitally.

To achieve faster or more accurate offset compensation, further time constants, comparators, and decoders can be provided.

The filtered input signal, which can be derived on a radio-frequency receiver, for example, can be supplied to the first comparator.

The principle described allows simple and reliable compensation for DC voltage offsets at a receiver output even if decoupling using series capacitors is not possible.

In addition, the filter unit has a third time constant and a second switch is used to change over to the third time constant. A second and a third comparator are connected downstream of the filter unit, and a second decoder is connected to a respective output of the second and third comparators, which output can be used to actuate the second switch. The second and third comparators together form a window comparator. As soon as the voltage value of the input signal exceeds an upper limit or undershoots a lower limit, then, to equalize quickly a very large DC voltage offset that exists, a second switch can change over to a third time constant, which is, preferably, less than the first and second time constants and can be used to compensate for the offset voltage quickly.

A second decoder connected to the output of the second and third comparators identifies any exceeding of an upper limit or any undershooting of a lower limit and connects the third time constant, possibly using the second switch.

The limit values for the window comparator can each be set using voltage sources. The upper limit should be situated somewhat above, and the lower limit should be situated somewhat below, the input voltage values arising with suitable selection of the threshold voltage.

All in all, the three switchable time constants provide the option of changing over from a mean time constant to a longer time constant during a user data transmission, on one hand, but, on the other hand, it is advantageously possible to change over to a long time constant even if further zeros or ones also occur in succession during determination of the decision threshold in the first comparator, which would, in such a case, result in the threshold value being corrupted if the mean time constant were retained.

The principle can be applied advantageously to the Bluetooth standard, for example. In that case, as described in the introduction, the preamble including an alternating string of zeros and ones is only 4 bits long, which means that the subsequent "access code" needs to be used concomitantly for threshold-value determination. However, this code includes zeros and ones in a random order, which means that the threshold value would be corrupted if there were no changeover to a longer time constant for a succession of several zeros or several ones.

In accordance with another feature of the invention, the third time constant is less than the first time constant, which is less than the second time constant.

In accordance with a further feature of the invention, the high-pass filters form the time constants.

In accordance with an added feature of the invention, the low-pass filters form the time constants.

In accordance with an additional feature of the invention, an analog low-pass filter can be produced using a series resistor having a grounded capacitor connected downstream thereof. A plurality of RC elements for forming a plurality of time constants can have a common capacitor.

In accordance with yet another feature of the invention, an analog high-pass filter can be constructed using a series capacitor having a grounded resistor connected downstream thereof. A plurality of high-pass filters for forming a plurality of time constants can have a common capacitor.

In accordance with yet a further feature of the invention, high-pass filters or low-pass filters can be produced as digital filters. To this end, a delay element can be provided. In such a case, the first and second decoders can vary a gain factor in a feedback loop to influence the time constant of the digital filter.

In accordance with yet an added feature of the invention, it is possible to change over between the voltage of the input signal and a controlled voltage source. This can be appropriate, for example, if a plurality of identical binary states coded in the input signal succeed one another during determination of an offset compensation value, which means that the compensation value would be corrupted with the time constant that is set. With long sequences of identical bits immediately succeeding one another, switching back and forth between input voltage and controlled voltage is performed repeatedly.

In accordance with yet an additional feature of the invention, low-pass filters form the first, second, and third time constants, a first of the low-pass filters has a first resistor, the controlled voltage source produces a voltage, the filter unit produces a threshold voltage, and a voltage present across the first resistor is changeable over between the voltage of the input signal and the voltage of the controlled voltage source, the voltage of the controlled voltage source having twice the threshold voltage minus the input voltage.

In accordance with again another feature of the invention, a first of the low-pass filters has a first resistor, a controlled voltage source produces a voltage, the input signal has a voltage, the filter unit produces a threshold voltage, and a voltage present across the first resistor is changeable over between the voltage of the input signal and the voltage of the controlled voltage source, the voltage of the controlled voltage source having twice the threshold voltage minus the input voltage.

If the input signal is in the form of a differential signal, the input voltage can be changed over by reversing the polarity of the differential signal lines. This also makes it possible to avoid corruption of the compensation value as a result of a long succession of identical states in the input signal. The first decoder can detect a succession of identical states immediately succeeding one another and can carry out appropriate polarity reversal. If, by way of example, ten successive logic ones are coded, then the input signal in the form of a differential signal can have its polarity reversed after three respective bits.

In accordance with a concomitant mode of the invention, there are provided the steps of supplying the input signal to a window comparator having a second comparator and a third comparator, comparing a voltage of the input signal with an upper and a lower voltage limit value, and effecting a changeover to a third time constant if the upper voltage limit value is exceeded or the lower voltage limit value is undershot.

Other features that are considered as characteristic for the invention are set forth in the appended claims.

Although the invention is illustrated and described herein as embodied in a compensation circuit and method for compensating for an offset, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 7 is a block and schematic circuit diagram of an exemplary embodiment of the circuit according to the invention with analog low-pass filters for an input signal available as a differential signal.

DESCRIPTION OF THE PREFERRED EMBODIMENTS

Figure 1:
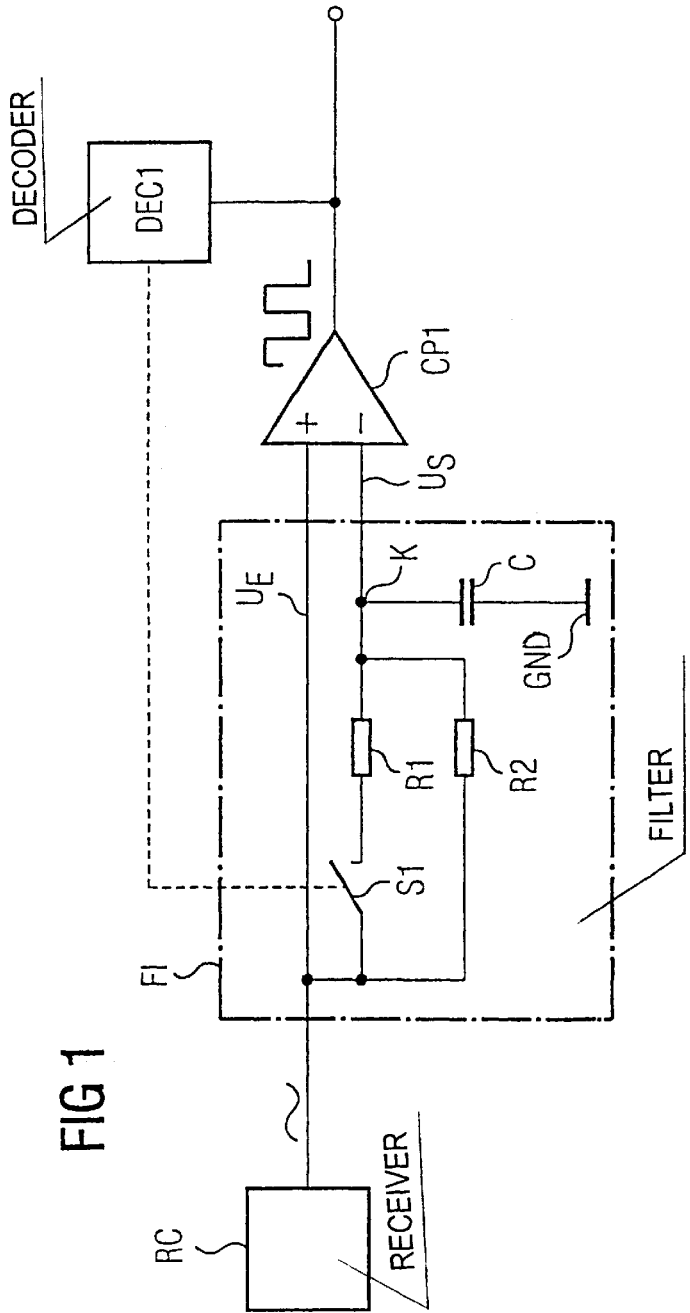
FIG. 1 is a block and schematic circuit diagram of a first exemplary embodiment of a circuit according to the invention.

Referring now to the figures of the drawings in detail and first, particularly to FIG. 1 thereof, there is shown a receiver RC that is connected to a first input of a first comparator CP1 and on which a signal with an input voltage $U_E$ can be derived. In addition, this input signal can be supplied to a first switch S1, which is connected in series with a first resistor R1. Connected in parallel with the first switch S1 and the free resistor R1 is a second resistor R2. The respective free end of the first and second resistors R1, R2, which are connected to one another at a node K, has a capacitor C connected to it that is grounded GND. A threshold voltage $U_S$ can be tapped off on the capacitor C and can be supplied to a second input of the first comparator CP1. Connected to the output of the first comparator CP1 is a first decoder DEC1, which influences the first switch S1.

The receiver RC is a Bluetooth receiver in which a frequency modulated signal is demodulated. In such a case, a carrier frequency for the frequency-modulated signal is assigned a mid-voltage at the output of the receiver RC. However, this intermediate voltage can have a DC voltage offset that can be caused by the carrier frequency tolerance of ±75 kHz, according to the Bluetooth specification. To determine a suitable threshold voltage $U_S$, it is, therefore, necessary to perform averaging over a multiplicity of sequential bits. To such an end, averaging is performed over the access code, which is 68 or 72 bits long in accordance with the Bluetooth specification, in a setting mode. This mean voltage value is stored in the capacitor C and is available to the comparator CP1 as a threshold voltage $U_S$ so that the comparator CP1 can detect the binary-coded states by comparing the voltage of the input signal $U_E$ with the threshold voltage $U_S$. The first resistor R1 forms, together with capacitor C, a first time constant, which is normally active in a setting mode. To such an end, the switch S1 is normally on in a setting mode. When the capacitor C has been charged to a mid-voltage, the switch S1 is turned off for a normal mode, succeeding the setting mode, in which user data are transmitted, which means that a second time constant is active, which is formed by the resistor R2 together with capacitor C. The second time constant is long in comparison with the first time constant. This means that the set threshold voltage $U_S$ in the capacitor C is virtually not altered during the full user signal in a time slot (burst). However, if, in the actual setting mode, that is to say, during the access code, a plurality of bits immediately succeeding one another represent the same state, the switch S1 is turned off during the actual setting mode until the next change of state occurs. For such actuation, the first decoder DEC1 is provided. The functionality of the decoder DEC1 is disposed in a baseband chip in the Bluetooth receiver, the baseband chip not being shown in the figures. If the first switch S1 were not turned off for a succession of several zeros or ones to which a respective voltage value of the input signal is assigned, then the voltage value across the capacitor C would no longer be the correct intermediate voltage, but, instead, would run toward the voltage value associated with a logic zero or with a logic one.

Figure 2:
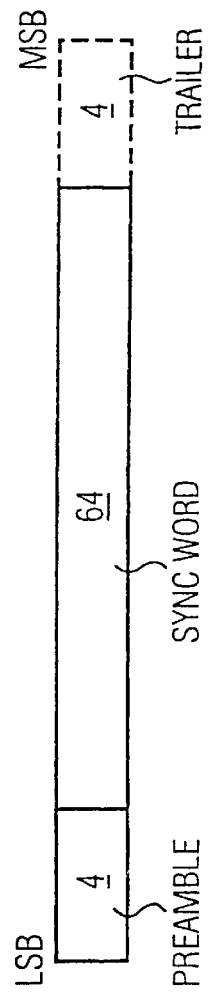
FIG. 2 is a diagrammatic illustration of a structure of and access code based upon the Bluetooth specification.

FIG. 2 shows the structure of the access code in accordance with the Bluetooth specification with a preamble PREAMBLE, a synchronization data SYNC WORD, and an annex TRAILER, which is not transmitted in every case. The preamble, whose first bit is the LSB (Least Significant Bit), includes 4 bits, the synchronization word includes 64 bits, and the annex includes 4 bits, the last of which is the MSB (Most Significant Bit). It is obvious that the 4 bits of the preamble are not sufficient for reliably determining a correct intermediate voltage and, hence, a suitable threshold value for evaluating the subsequent user data. Instead, the bits in the synchronization word of the access code additionally need to be used. However, these can have up to 28 bits immediately succeeding one another without a change of state. The changeover between two time constants, as shown in FIG. 1, is, therefore, suitable in order to ascertain the correct threshold voltage $U_S$ in spite of this.

Figure 3:
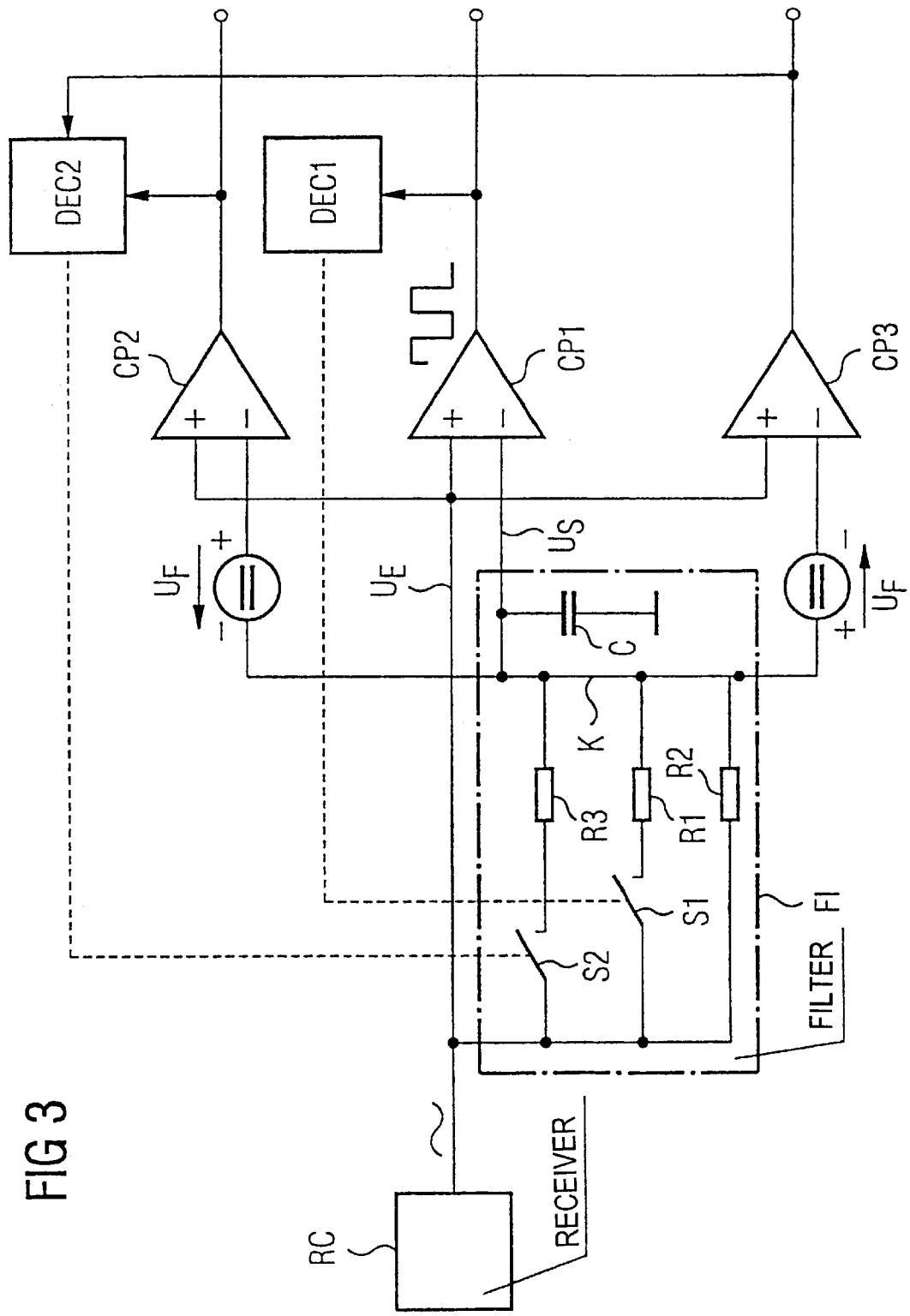
FIG. 3 is a block and schematic circuit diagram of a second exemplary embodiment of the circuit according to the invention.

FIG. 3 shows another exemplary embodiment, in which, as an addition to the exemplary embodiment shown in FIG. 1, a window comparator and a third time constant are provided for fast equalization of large DC voltage offsets in the input signal. For such a purpose, a second switch S2 is connected in series with a third resistor R3 between the receiver RC and the node K. The input signal can respectively be supplied to the first input of the second comparator CP2 and of the third comparator CP3. The second input of the second comparator CP2 and that of the third comparator CP3 are connected to the node K through a respective voltage source. In such a case, a respective voltage $U_F$ drops across the voltage sources. Such a voltage $U_F$ needs to be chosen such that, when the circuit shown in FIG. 3 is in a normal mode, that is to say, with the threshold voltage $U_S$ set correctly, neither the comparator CP2 nor the comparator CP3 respond. If a high DC voltage offset arises at the start of a setting mode and exceeds an upper limit that can be detected using the second comparator CP2 or undershoots a lower limit that can be set using the third comparator CP3, then such a state is detected by the second decoder DEC2, which influences a second switch S2 that activates a third time constant so that the capacitor C has its charge reversed to an appropriately adjusted threshold voltage. The third time constant formed using the third resistor and the capacitor C, consequently, needs to be a short time constant that is shorter than the first time constant, which in turn is shorter than the second time constant. Accordingly, the resistors have the relationship R3<R1<R2. To satisfy the requirements of the Bluetooth system, the third time constant should correspond to an equivalent of approximately 2 bits, the first time constant should correspond to an equivalent of 15 bits, and the second time constant should correspond to an equivalent of 400 bits. Hence, a reliable threshold voltage can be set even for a very short preamble. The addition of the third time constant allows fast compensation for large DC offsets.

Figure 4:
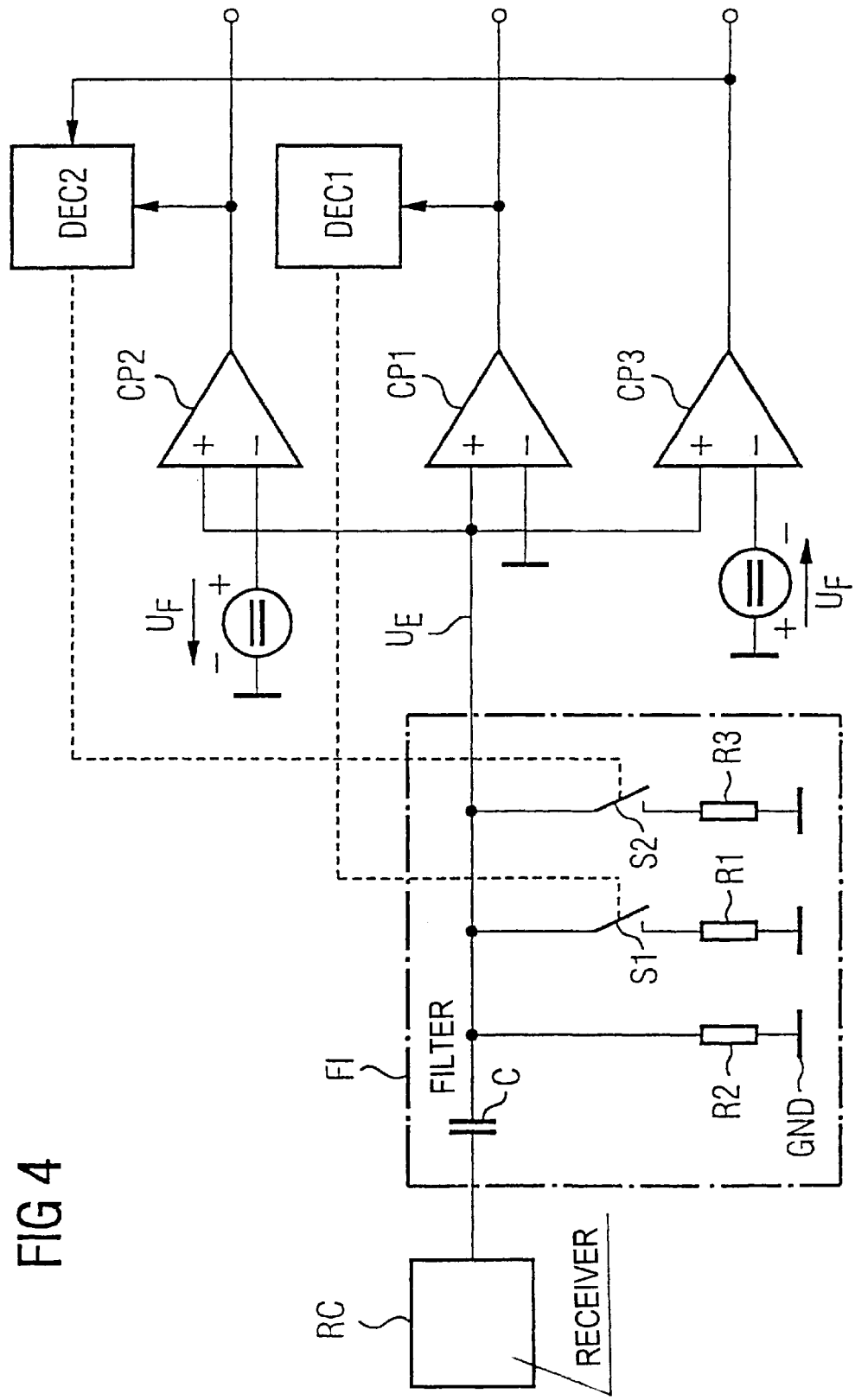
FIG. 4 is a block and schematic circuit diagram of an exemplary embodiment of the circuit according to the invention with high-pass filters operating in analog mode.

FIG. 4 shows an exemplary embodiment of the invention with analog high-pass filters. A capacitor C, which is connected to a receiver RC, can have an input signal supplied to it. The capacitor C has a plurality of resistors R2, R1, R3 connected downstream of it which are respectively grounded GND. In addition, the capacitor C is connected to a first input of a first comparator CP1. A first switch S1 and a second switch S2 are used to change over between the time constants. A first decoder DEC1 is connected to the output of the first comparator CP1 and influences the first switch S1. The second comparator CP2 and the third comparator CP3 are used to produce a window comparator. To such an end, the second inputs of the second and third comparators CP2, CP3 are respectively grounded through a voltage source $U_F$. The first input of the second and third comparators CP2, CP3 is respectively connected to the first input of the first comparator CP1. A second decoder DEC1 is respectively connected to the output of the second and third comparators CP2, CP3 and can influence the second switch S2. If the voltage $U_E$ of the input signal exceeds an upper limit value or if it undershoots a lower limit value, then the decoder DEC2 turns on the second switch S2 such that a DC voltage offset that is present can quickly be equalized. To such an end, the high-pass filter formed using the third resistor R3 and the capacitor C has a short time constant.

Figure 5:
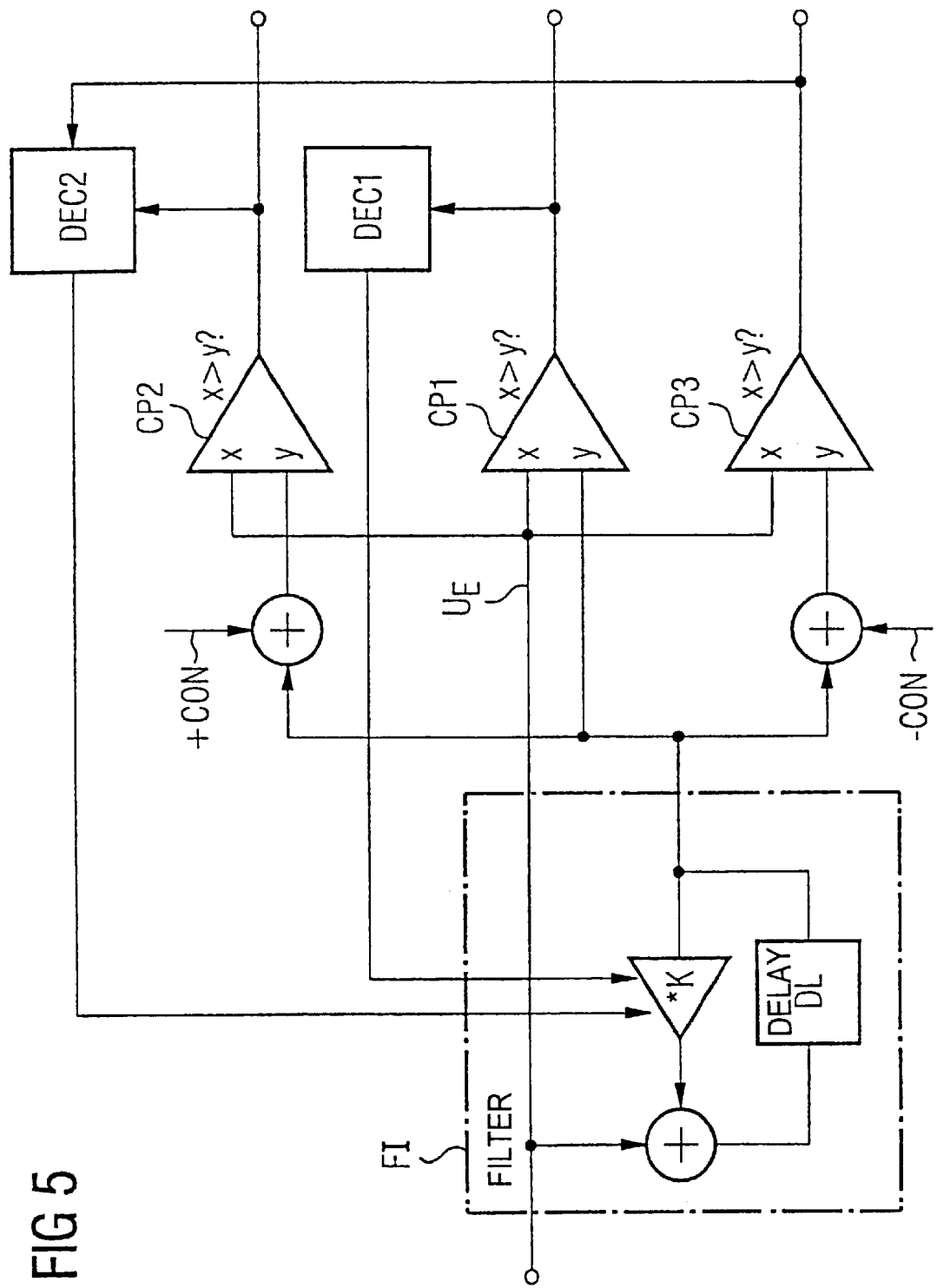
FIG. 5 is a block and schematic circuit diagram of an exemplary embodiment of the circuit according to the invention with low-pass filters operating in digital mode.

FIG. 5 shows an exemplary embodiment with digital low-pass filters in the filter unit FI. Apart from the digital implementation of the low-pass filters, the exemplary embodiment shown in FIG. 5 corresponds to the exemplary analog embodiment shown in FIG. 3. A digital low-pass filter having switchable time constants is produced, by way of example, by virtue of the digitally coded input signal being supplied to a summation node, at which point it is added to the delayed input signal amplified by a factor K. To such an end, a delay element DL and a digital amplifier with an adjustable multiplier K are indicated. As shown in FIG. 5, the configuration is connected to a second input of the first comparator CP1. The threshold values for the window comparator CP2, CP3 are respectively indicated with digitally coded constants +CON and −CON.

Figure 6:
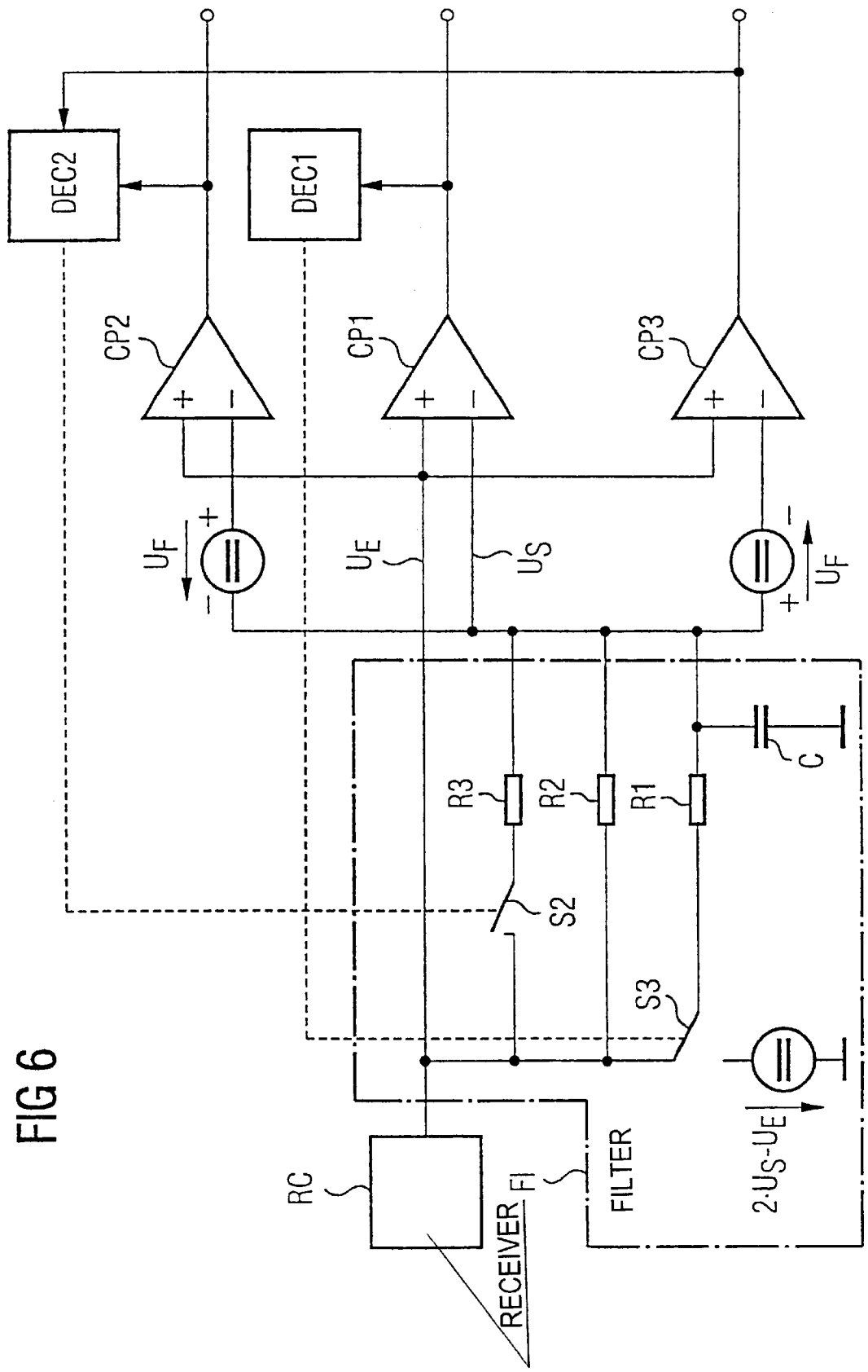
FIG. 6 is a block and schematic circuit diagram of an exemplary embodiment of the circuit according to the invention with analog low-pass filters and a changeover device for the input signal.

FIG. 6 shows an exemplary embodiment of the present invention in which the first switch, which is in the form of a changeover switch S3, can change over the voltage dropping across the first resistor R1 by virtue of the changeover switch S3 being able to change over from the voltage of the input signal $U_E$ to a controlled voltage source across which the voltage $2U_S-U_E$ drops. This changes over the voltage dropping across the first resistor R1 from $U_E-U_S$ to $U_S-U_E$. The controlled voltage source has the value $2U_S-U_E$ because the capacitor C has already been charged to the voltage $U_S$. Apart from this additional voltage source $2U_S-U_E$, the exemplary embodiment shown in FIG. 6 corresponds to the exemplary embodiment shown in FIG. 3.

FIG. 7 shows an exemplary embodiment with an input signal that is available as a differential signal, and with a filter unit FI that is produced using analog RC elements. The second decoder DEC2 and the actuation of the first switches S1, S1' and of the second switches S2, S2' are not shown in FIG. 7 for reasons of clarity. The switches S3A, S3A', S3B, S3B' can be used to reverse the polarity of the input signal that is to be supplied to the filter unit. This serves to avoid incorrect compensation, which can arise as a result of numerous bits in identical states immediately succeeding one another. If the first decoder DEC1, detects, by way of example, three bits in the same state immediately succeeding one another, the input voltage $U_E$ has its polarity reversed by virtue of the switches S3A, S3A', which are on in a normal state, being turned off and the switches S3B, S3B' being turned on. To such an end, the first decoder DEC1 has two complementary outputs. The first comparator CP1, to whose output the first decoder is connected, has the differential voltage $U_E$–$U_S$ between the input voltage $U_E$ and the threshold voltage $U_S$ that falls across the capacitor C supplied to it.

I claim:

1. A compensation circuit for an input signal having an offset, comprising:
    a filter unit receiving the input signal in a signal flow direction and having:
        a signal path with a first time constant;
        a signal path with a second time constant; and
        a signal path with a third time constant;
    a first switch connected to said signal path with said first time constant and to said signal path with said second time constant for changing said filter unit between said signal path with said first time constant and said signal path with said second time constant;
    a second switch connected to said signal path with said third time constant for changing said filter unit over to said signal path with said third time constant;
    a first comparator connected downstream of said filter unit with respect to said signal flow direction, said first comparator having a first output;
    a second comparator connected downstream of said filter unit with respect to said signal flow direction, said second comparator having a second output;
    a third comparator connected downstream of said filter unit with respect to said signal flow direction, said third comparator having a third output;
    a first decoder connected to said first output and to said first switch for controlling said first switch; and
    a second decoder connected to said second switch and to a respective one of said second output and said third output for actuating said second switch.

2. The compensation circuit according to claim 1, wherein:
    said third time constant is less than said first time constant; and
    said first time constant is less than said second time constant.

3. The compensation circuit according to claim 1, including high-pass filters forming said first, second, and third time constants.

4. The compensation circuit according to claim 3, wherein said high-pass filters have analog RC elements.

5. The compensation circuit according to claim 3, wherein said high-pass filters are digital filters.

6. The compensation circuit according to claim 3, wherein said low-pass filters are digital filters.

7. The compensation circuit according to claim 1, including low-pass filters forming said first, second, and third time constants.

8. The compensation circuit according to claim 7, wherein said low-pass filters have analog RC elements.

9. The compensation circuit according to claim 8, wherein:
    a first low-pass filter of said low-pass filters has a first resistor;
    a controlled voltage source produces a first voltage;
    the input signal has a an input voltage;
    said filter unit produces a threshold voltage; and
    a second voltage present across said first resistor is changeable over between the voltage of the input signal and said first voltage of said controlled voltage source, said first voltage of said controlled voltage source having twice said threshold voltage minus the input voltage.

10. The compensation circuit according to claim 1, wherein the input signal has an input voltage and including:
    a controlled voltage source; and
    a changeover switch connected to the input voltage and to said controlled voltage source for changing over between the input voltage and said controlled voltage source.

11. The compensation circuit according to claim 9, wherein:
    low-pass filters form said first, second, and third time constants;
    a first low-pass filter of said low-pass filters has a first resistor;
    said controlled voltage source produces a first voltage;
    said filter unit produces a threshold voltage; and
    a second voltage present across said first resistor is changeable over between the voltage of the input signal and said first voltage of said controlled voltage source, said first voltage of said controlled voltage source having twice said threshold voltage minus the input voltage.

12. The compensation circuit according to claim 1, wherein the input signal is a differential signal.

13. The compensation circuit according to claim 12, including third switches connected upstream of said filter unit with respect to said signal flow direction, said third switches reversing a polarity of the input signal.

14. The compensation circuit according to claim 1, wherein the input signal is derivable on a radio-frequency receiver.

15. The compensation circuit according to claim 1, including a radio-frequency receiver connected upstream of said filter unit with respect to said signal flow direction, said radio-frequency receiver receiving and deriving the input signal and supplying it to said filter unit.

16. A method for compensating for an offset in an input signal, which comprises:
    filtering an input signal utilizing a first time constant;
    forming an output signal having discrete states by comparing the filtered input signal with one of a threshold voltage and the input signal in unfiltered form;
    effecting a changeover from the first time constant to a second time constant which is longer than the first time constant in a setting mode if and for as long as the output signal has at least two identical, successive states; and
    setting the second time constant in a normal mode following the setting mode.

17. The method according to claim 16, which further comprises:
    carrying out the forming step by forming, with a first comparator, the output signal having discrete states by comparing the filtered input signal with one of the threshold voltage and the input signal in unfiltered form;
    supplying the input signal to a window comparator having a second comparator and a third comparator;
    comparing an input voltage of the input signal with an upper and a lower voltage limit value; and
    effecting a changeover to a third time constant if one of:
        the upper voltage limit value is exceeded; and
        the lower voltage limit value is undershot.

* * * * *